(12) United States Patent
Geurts (10) Patent No.: US 10,484,624 B2
(45) Date of Patent: Nov. 19, 2019

(54) IMAGING SENSORS WITH PER-PIXEL CONTROL

(71) Applicant: SEMICONDUCTOR COMPONENTS INDUSTRIES, LLC, Phoenix, AZ (US)

(72) Inventor: Tomas Geurts, Haasrode (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 151 days.

(21) Appl. No.: 15/644,957

(22) Filed: Jul. 10, 2017

(65) Prior Publication Data

US 2019/0014273 A1 Jan. 10, 2019

(51) Int. Cl.
| | |
|---|---|
| H04N 5/345 | (2011.01) |
| H04N 5/359 | (2011.01) |
| H04N 5/355 | (2011.01) |
| H04N 5/353 | (2011.01) |
| H04N 5/378 | (2011.01) |

(52) U.S. Cl.
CPC ......... H04N 5/3454 (2013.01); H04N 5/353 (2013.01); H04N 5/3559 (2013.01); H04N 5/3592 (2013.01); H04N 5/378 (2013.01)

(58) Field of Classification Search
CPC ... H04N 5/3454; H04N 5/353; H04N 5/35554
See application file for complete search history.

(56) References Cited

U.S. PATENT DOCUMENTS

| | | | |
|---|---|---|---|
| 7,969,490 B2 | 6/2011 | Block | |
| 8,445,828 B2 | 5/2013 | He | |
| 2002/0017565 A1 | 2/2002 | Ju et al. | |
| 2004/0155175 A1 | 8/2004 | McNulty | |
| 2009/0057724 A1* | 3/2009 | Arimoto | H01L 27/14603 257/252 |
| 2013/0001404 A1* | 1/2013 | Meynants | H01L 27/14609 250/208.1 |
| 2014/0252201 A1* | 9/2014 | Li | H01L 27/14616 250/208.1 |

FOREIGN PATENT DOCUMENTS

EP 0300365 1/1989

* cited by examiner

*Primary Examiner* — Christopher K Peterson
(74) *Attorney, Agent, or Firm* — Treyz Law Group, P.C.; Joseph F. Guihan (57) ABSTRACT

Image sensors may include pixel circuitry to enable per-pixel integration time and read-out control. Two transistors may be coupled in series for per-pixel control, with one of the transistors being controlled on a row-by-row basis and the other transistor being controlled on a column-by-column basis. The two transistors in series may be coupled directly to each other without any intervening structures. Two transistors in series between a photodiode and a power supply terminal enables per-pixel control of starting an integration time, two transistors in series between a photodiode and a charge storage region enables per-pixel control of ending an integration time, and two transistors in series between a charge storage region and a floating diffusion region enables per-pixel control of read-out.

15 Claims, 8 Drawing Sheets

IMAGING SENSORS WITH PER-PIXEL CONTROL

BACKGROUND

This relates generally to imaging systems and, more particularly, to imaging systems that have imaging pixels.

Modern electronic devices such as cellular telephones, cameras, and computers often use digital image sensors. Image sensors (sometimes referred to as imagers) may be formed from a two-dimensional array of image sensing pixels. Each pixel includes a photosensitive layer that receives incident photons (light) and converts the photons into electrical charge. Image sensors are sometimes designed to provide images to electronic devices using a Joint Photographic Experts Group (JPEG) format.

Conventional image sensors are fabricated on a semiconductor substrate using complementary metal-oxide-semiconductor (CMOS) technology or charge-coupled device (CCD) technology. In CMOS image sensors, a rolling shutter or a global shutter may be used. In a global shutter, every pixel in the image sensor may simultaneously capture an image, whereas in a rolling shutter each row of pixels may sequentially capture an image. In CMOS image sensors with rolling shutters or global shutters, read-out is typically performed on a line-by-line basis. However, these integration and read-out schemes limit the flexibility of the image sensors.

It would therefore be desirable to provide improved image sensors.

DETAILED DESCRIPTION

Figure 1:
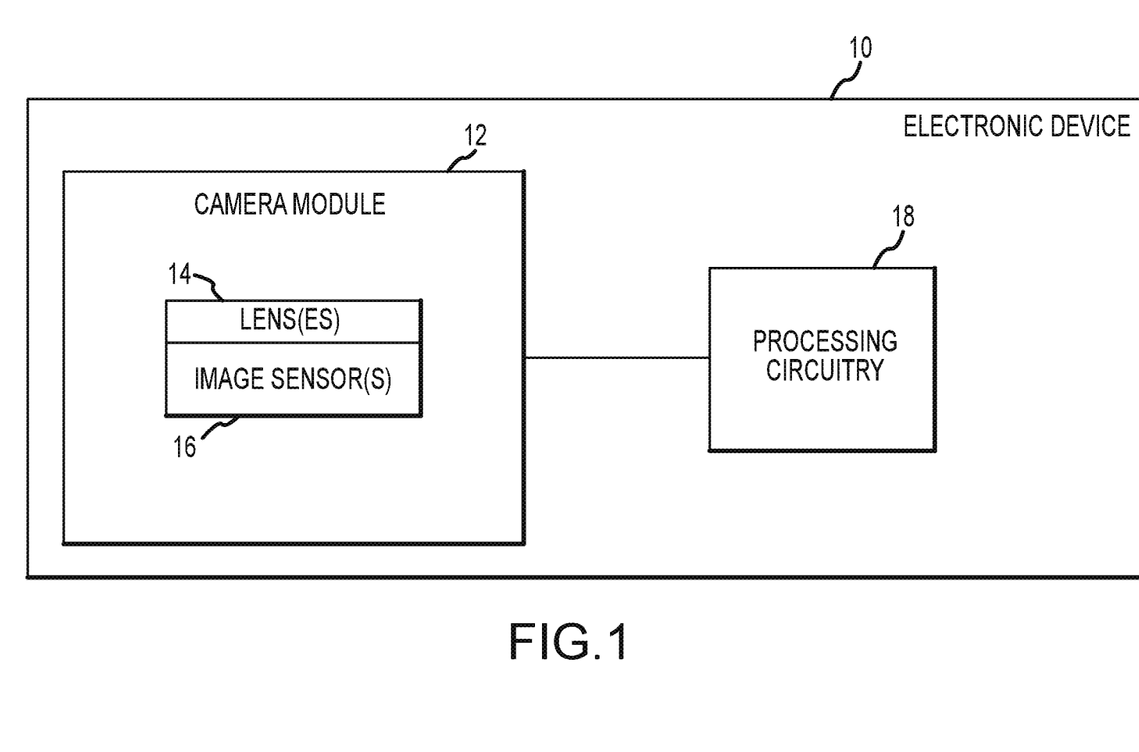
FIG. 1 is a schematic diagram of an illustrative electronic device that may include an image sensor in accordance with an embodiment of the present invention.

Embodiments of the present invention relate to image sensors that have per-pixel read-out and/or integration time control. An illustrative electronic device that may include an image sensor with per-pixel read-out and integration time control is shown in FIG. 1. Electronic device 10 may be a digital camera, a computer, a cellular telephone, a medical device, or other electronic device. Camera module 12 (sometimes referred to as an imaging device) may include image sensor 16 and one or more lenses 14. During operation, lenses 14 focus light onto image sensor 16. Image sensor 16 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 16 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 16 may be provided to processing circuitry 18. Processing circuitry 18 may be used to perform image processing functions such as automatic focusing functions, depth sensing, data formatting, adjusting white balance and exposure, implementing video image stabilization, face detection, etc.

Processing circuitry 18 may also be used to compress raw camera image files if desired (e.g., to Joint Photographic Experts Group or JPEG format). In a typical arrangement, which is sometimes referred to as a system on chip (SOC) arrangement, image sensor 16 and processing circuitry 18 are implemented on a common integrated circuit. The use of a single integrated circuit to implement image sensor 16 and processing circuitry 18 can help to reduce costs. This is, however, merely illustrative. If desired, image sensor 16 and processing circuitry 18 may be implemented using separate integrated circuits. For example, image sensor 16 and processing circuitry 18 may be formed using separate integrated circuits that have been stacked. Processing circuitry 18 may include microprocessors, microcontrollers, digital signal processors, application specific integrated circuits, or other processing circuits.

Figure 2:
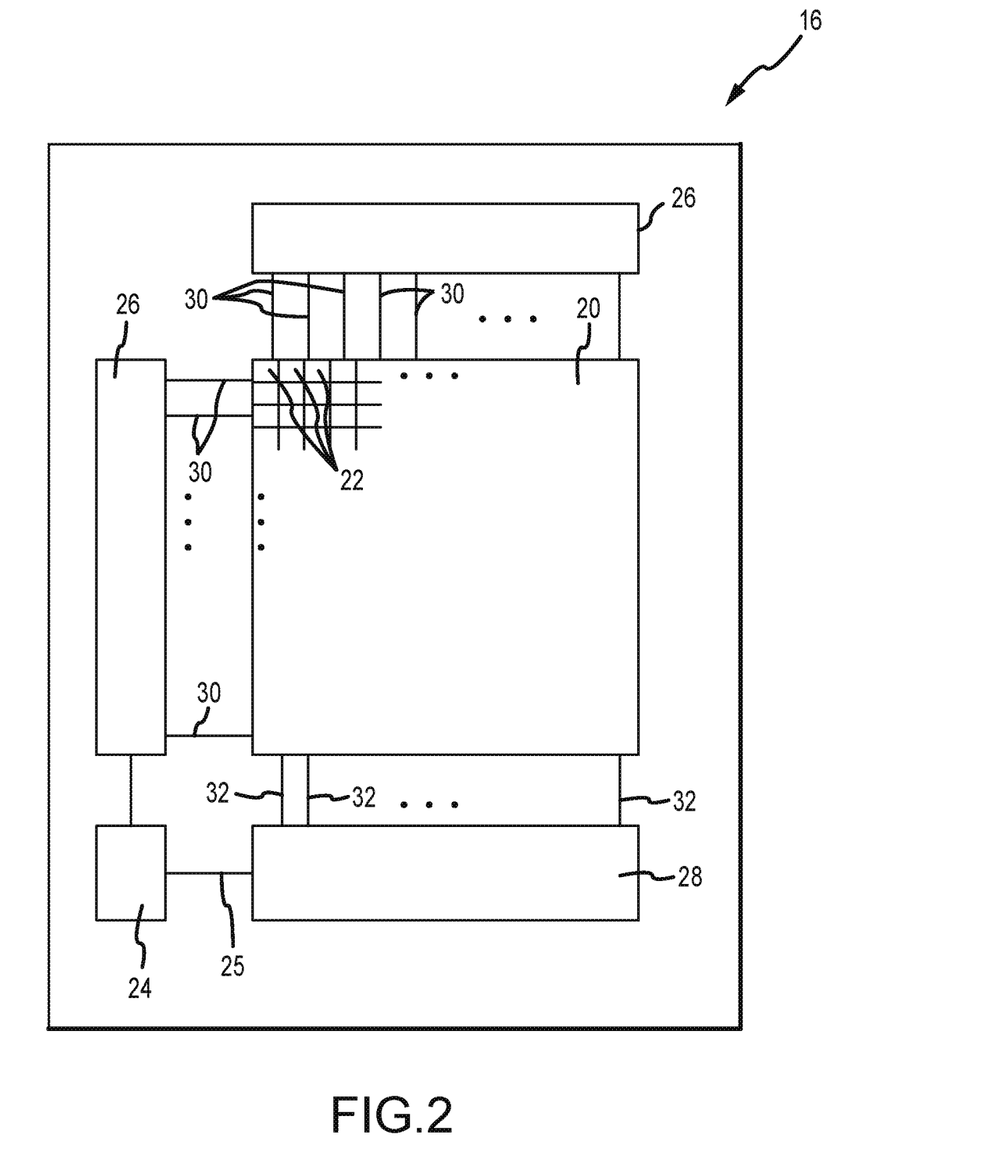
FIG. 2 is a diagram of an illustrative pixel array and associated readout circuitry for reading out image signals from the pixel array in accordance with an embodiment of the present invention.

As shown in FIG. 2, image sensor 16 may include pixel array 20 containing image sensor pixels 22 arranged in rows and columns (sometimes referred to herein as image pixels or pixels) and control and processing circuitry 24 (which may include, for example, image signal processing circuitry). Array 20 may contain, for example, hundreds or thousands of rows and columns of image sensor pixels 22. Control circuitry 24 may be coupled to pixel control circuitry 26 and image readout circuitry 28 (sometimes referred to as column control circuitry, readout circuitry, processing circuitry, or column decoder circuitry).

Pixel control circuitry 26 may receive pixel or row addresses from control circuitry 24 and supply corresponding control signals such as reset, row-select, charge transfer, dual conversion gain, and readout control signals to pixels 22 over control paths 30. A first portion of the pixel control circuitry may provide control signals to rows of pixels 22 using horizontal lines. A second portion of the pixel control circuitry may provide control signals to columns of pixels 22 using vertical lines. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel in array 20 may be selected using pixel control circuitry 26 and image signals generated by the image pixel can be read out along a respective column line 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

Figure 3:
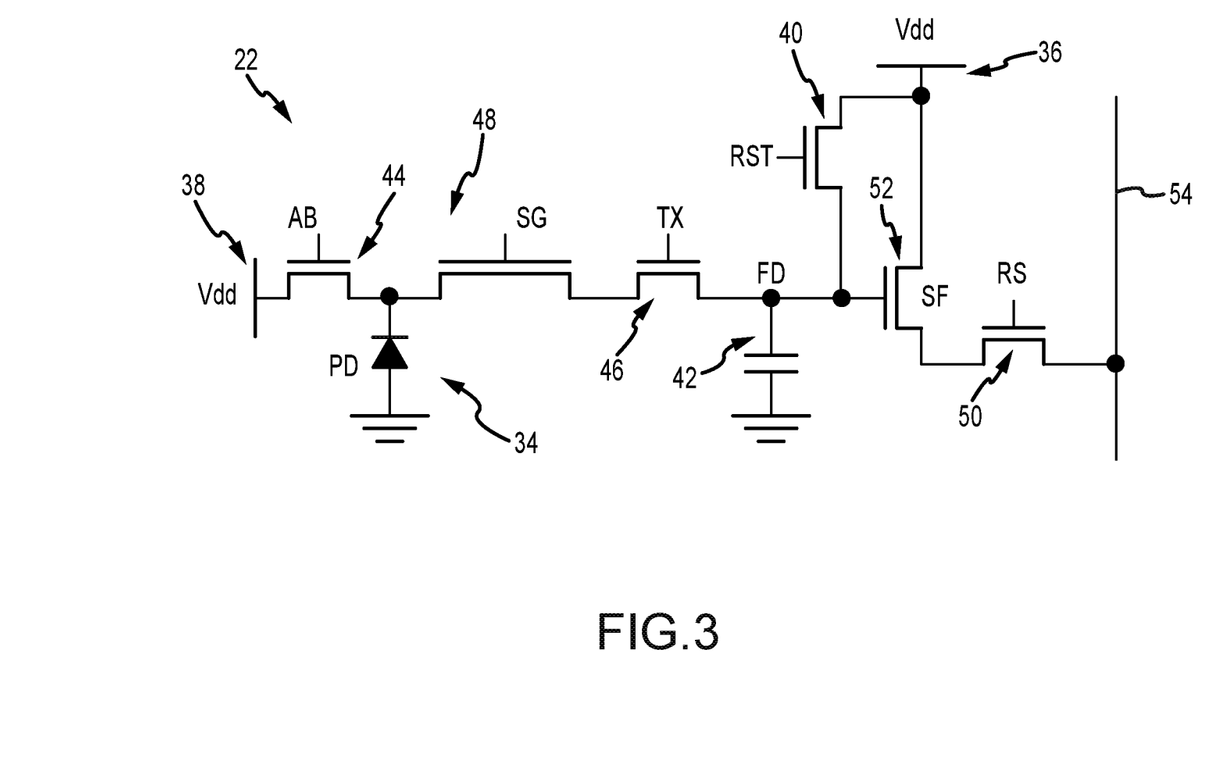
FIG. 3 is a circuit diagram of an illustrative global shutter imaging pixel in accordance with an embodiment of the present invention.

FIG. 3 is a circuit diagram of an illustrative image pixel 22 in image sensor 16. As shown in FIG. 3, pixel 22 includes a photosensitive element such as photodiode 34 (PD). A power supply voltage Vdd may be supplied at power supply terminal 36 (sometimes referred to as a bias voltage supply line). A second power supply voltage Vdd may be supplied at second power supply terminal 38 (sometimes referred to as a bias voltage supply line). Incoming light may be collected by photodiode 34 after passing through a color filter structure. Photodiode 34 generates charge (e.g., electrons) in response to receiving impinging photons. The amount of charge that is collected by photodiode 34 depends on the intensity of the impinging light and the exposure duration (or integration time).

Before an image is acquired, reset control signal RST may be asserted. Asserting signal RST turns on reset transistor 40 and resets charge storage node 42 (sometimes referred to as floating diffusion region FD) to Vdd. Reset control signal RST may then be deasserted to turn off reset transistor 40.

Pixel 22 may include an anti-blooming transistor such as anti-blooming transistor 44. Anti-blooming transistor 44 may have a gate terminal that is controlled by anti-blooming control signal AB. Asserting anti-blooming control signal AB turns on anti-blooming transistor 44 and resets photodiode 34 to power supply voltage Vdd (e.g., by connecting Vdd to photodiode 34 through anti-blooming gate 44). When signal AB is deasserted, photodiode 34 may be allowed to accumulate photo-generated charge.

Because charge is allowed to accumulate on photodiode 34 when signal AB is deasserted (i.e., when AB is low), the OFF state of transistor 44 may correspond to an open electronic shutter for pixel 22. Similarly, because photodiode 34 is reset to power supply voltage Vdd when signal AB is asserted (i.e., when AB is high), the ON state of transistor 44 may correspond to a closed electronic shutter for pixel 22. In general, an "open" electronic shutter may be used herein to refer to the state in which photodiode 34 is allowed to accumulate charge (i.e., the state in which transistor 44 is deasserted), whereas a "closed" electronic shutter may be used herein to refer to the state in which photodiode 34 is reset to power supply voltage Vdd (i.e., the state in which transistor 44 is asserted). Anti-blooming transistor 44 may sometimes be referred to as a shutter gate.

Pixel 22 may include a transfer transistor 46. Transfer transistor 46 may have a gate terminal that is controlled by transfer control signal TX. Transfer signal TX may be pulsed to transfer charge to charge storage region 42. Floating diffusion region 42 may be a doped semiconductor region (e.g., a region in a silicon substrate that is doped by ion implantation, impurity diffusion, or other doping process).

If desired, pixel 22 may have additional storage regions for temporarily storing charge transferred from photodiode 34. For example, a charge storage region such as storage gate 48 may be formed between photodiode 34 and transfer transistor 46. Storage gate 48 may receive a storage gate control signal SG. When the storage gate control signal SG is asserted, accumulated charge in photodiode 34 may be transferred to a charge storage region (in storage gate 48). Then, transfer transistor 46 may be asserted to transfer the charge from the charge storage region (i.e., storage gate 48) to floating diffusion region 42.

Pixel 22 may include readout circuitry such as row-select transistor 50 (RS) and source-follower transistor 52 (SF). Transistor 50 may have a gate that is controlled by row select signal RS. When signal RS is asserted, transistor 50 is turned on and a corresponding signal Vout (e.g. an output signal having a magnitude that is proportional to the amount of charge at floating diffusion node 42) is passed onto column line 54.

In a typical image pixel array configuration, there are numerous rows and columns of pixels 22. A column readout path such as output line 54 may be associated with each column of pixels 22 (e.g. each image pixel 22 in a column may be coupled to output line 54 through an associated row-select transistor 50). Signal RS may be asserted to read out signal Vout from a selected image pixel onto column readout path 54. Image data Vout may be fed to processing circuitry 18 for further processing.

An image sensor with pixels 22 as shown in FIG. 3 may be read row-by-row. Every pixel in a row receives the same transfer signal (TX), reset signal (RST), and row select signal (RS). This means that the integration time and read-out scheme for each pixel can only be controlled on a per-row basis. In some circumstances, it may be desirable to have additional control of pixel integration time and read-out.

Figure 4:
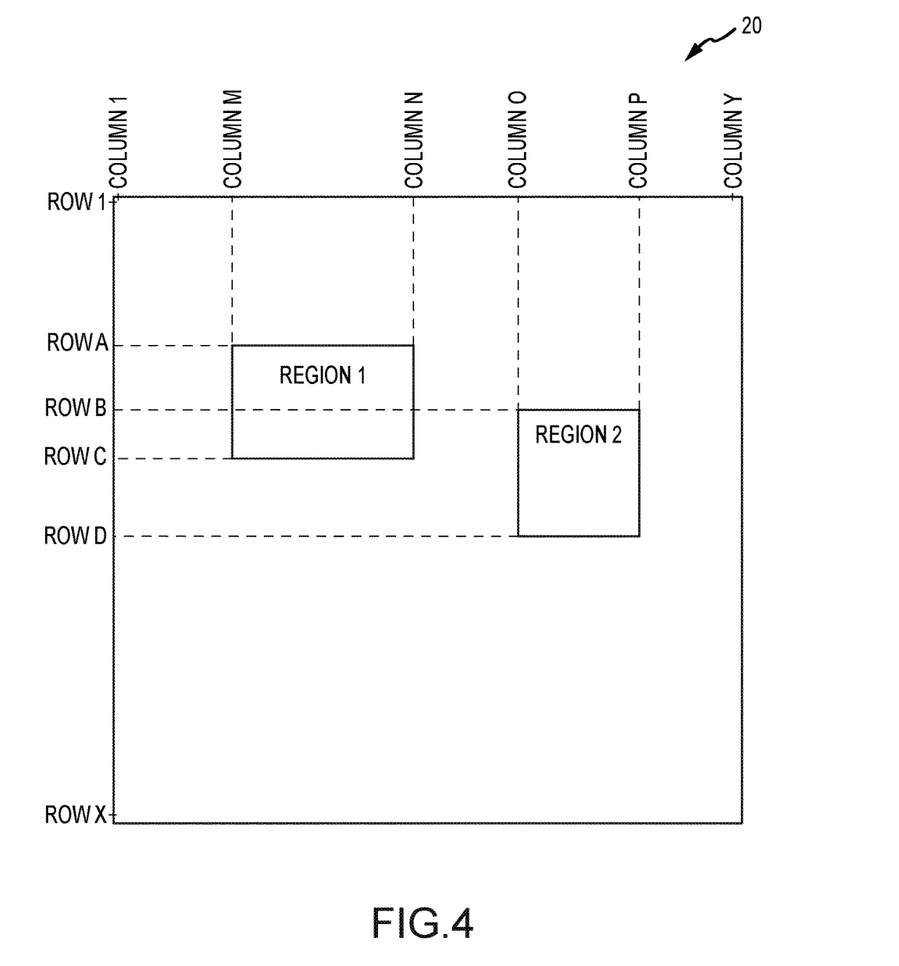
FIG. 4 is a top view of an illustrative image sensor with different regions of interest in accordance with an embodiment of the present invention.

FIG. 4 is a top view of an illustrative pixel array 20 showing an example in which per-pixel integration time or read-out control may be desirable. In the example of FIG. 4, pixel array 20 has "X" number of rows of pixels and "Y" number of columns of pixels. In some scenarios, it may be desirable to image and read only portions of the pixel array (instead of the entire array of pixels). For example, processing circuitry 18 may determine that region 1 and region 2 of pixel array 20 have the most (or only) relevant information from the imaged scene. Therefore, it would be desirable to read and process the image data from regions 1 and 2 as quickly as possible. However, this is difficult in embodiments where the pixels must be read line-by-line. In FIG. 4, region 1 extends from column M to column N and from row A to row C. Region 2 extends from column O to column P and from row B to row D. When pixel array 20 includes pixels of the type shown in FIG. 3 (and the pixels must be read line by line), row A must be read in its entirety (including columns 1 through Y) even though the pertinent information is isolated to columns M through N.

This type of scenario illustrates the advantage of per-pixel control in an image sensor. If pixels 22 in pixel array 20 can be read on a per-pixel basis, the image sensor may obtain the desired image information faster while reducing requisite memory and computing power demands. For example, if pixel array 20 has per-pixel read-out control, only columns M through N of row A may be read (foregoing columns 1 through M and N through Y). Additionally, image data from different rows may be read simultaneously. For example, columns M through N of row A and columns O through P of row B may be read simultaneously, allowing for the image data from regions 1 and 2 to be obtained and processed as quickly as possible.

There are a number of scenarios in which per-pixel control may be desirable. Image sensors may be included in vehicle safety systems, for example. In a vehicle safety system, images captured by the image sensor may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a pedestrian detection system, a lane keeping system (sometimes referred to as a lane drift avoidance system), etc. In at least some instances, an imaging sensor may form part of an imaging system in a semi-autonomous or autonomous self-driving vehicle. Such imaging systems may capture images and detect nearby vehicles, objects, or hazards using those images. If a nearby vehicle is detected in an image, the vehicle safety system may, if desired, operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle. In these types of applications, it may be desirable for an image sensor to quickly obtain image information regarding a specific area using per-pixel control.

Image sensors with per-pixel control may also be useful in gesture tracking. For example, an image sensor in a system (such as an augmented reality system or virtual reality system) may detect hand motions or other gestures. Processing circuitry may interpret the hand motions and control the system accordingly. In this example, it is desirable to obtain image data of the user's hand as quickly as possible, while other parts of the scene are less critical. Per-pixel read-out control is therefore helpful in these applications.

Per-pixel control may be useful for obtaining high dynamic range (HDR) images or images with different exposure moments in a variety of applications. When every pixel in a row receives the same transfer signal (TX), reset signal (RST), and row select signal (RS) (as described in connection with FIG. 3), every pixel in the row must have the same integration time. By enabling per-pixel control of integration time, certain portions of each row may have different integration times. Looking at FIG. 4, this could be useful in a scenario where region 1 has a high illumination level and region 2 has a low illumination level. Row C, for example, as portions in both regions 1 and 2. If row C has the same integration time across the row, poor image data will be obtained in either region 1 or region 2 for row C. If per-pixel control is enabled, however, the pixels of row C in region 1 may have an integration time optimized for high light levels and the pixels of row C in region 2 may have an integration time optimized for low light levels.

Figure 5:
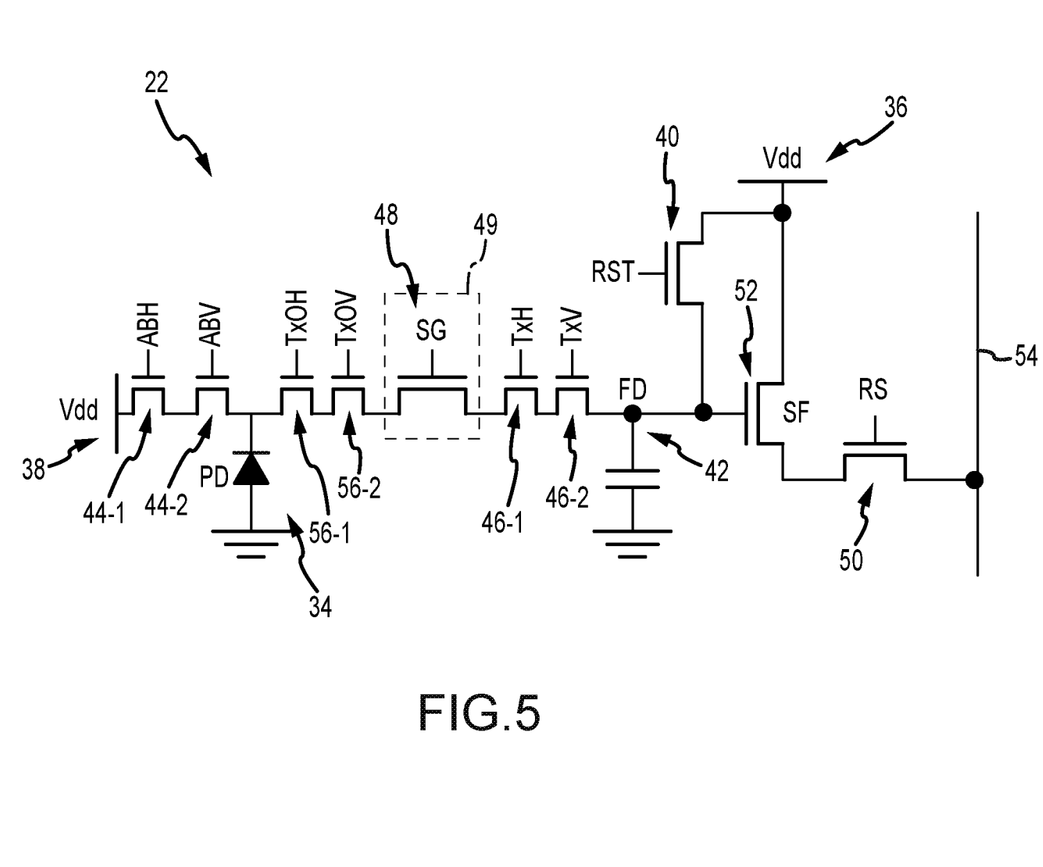
FIG. 5 is a circuit diagram of an illustrative imaging pixel with a charge storage region and per-pixel control in accordance with an embodiment of the present invention.

FIG. 5 is a circuit diagram of an illustrative image pixel 22 in image sensor 16 with per-pixel control. As shown in FIG. 5, pixel 22 includes a photodiode 34, floating diffusion region 42, source-follower transistor 52, and row-select transistor 50 similar to as shown in FIG. 3. However, instead of a single anti-blooming transistor 44 (as in FIG. 3), pixel 22 in FIG. 5 includes horizontal anti-blooming transistor 44-1 and vertical anti-blooming transistor 44-2. Horizontal anti-blooming transistor 44-1 receives horizontal anti-blooming control signal ABH and vertical anti-blooming transistor 44-2 receives vertical anti-blooming control signal ABV. The same horizontal anti-blooming control signal may be applied to every pixel in a particular row, whereas the same vertical anti-blooming control signal may be applied to every pixel in a particular column.

In FIG. 3, asserting anti-blooming transistor 44 connects Vdd to photodiode 34, clearing photodiode 34 of charge. In FIG. 5, photodiode 34 will only be connected to Vdd and cleared of charge if both horizontal anti-blooming transistor 44-1 and vertical anti-blooming transistor 44-2 are asserted. Take the aforementioned example of region 1 in FIG. 4. To reset the photodiode in row A and column M when pixel array 20 has pixels of the type shown in FIG. 3, the anti-blooming transistor is asserted and the photodiode of every pixel in row A is reset. If the pixel array includes pixels of the type shown in FIG. 5, however, the horizontal anti-blooming control signal associated with row A and the vertical anti-blooming control signal associated with column M are asserted. This causes transistors 44-1 and 44-2 to be asserted, clearing photodiode 34 of charge for the pixel in row A, column M. However, the remaining pixels in the array will not be affected. Take the pixel in row A and column N. The horizontal anti-blooming control signal associated with row A is asserted, which results in transistor 44-1 being asserted. However, the vertical anti-blooming control signal associated with column N has not been asserted, which means transistor 44-2 is deasserted. Because transistor 44-2 is deasserted, the pixel in row A and column N will not have its photodiode reset. Similarly, take the pixel in row C and column M. The vertical anti-blooming control signal associated with column M is asserted, which results in transistor 44-2 being asserted. However, the horizontal anti-blooming control signal associated with row C has not been asserted, which means transistor 44-1 is deasserted. Because transistor 44-1 is deasserted, the pixel in row C and column M will not have its photodiode reset.

Although the above examples illustrate a single pixel being controlled (e.g., for sampling and read-out) at a given time, it should be understood that multiple pixels may be controlled simultaneously using the control signals. For example, a portion or all of one or more rows and/or a portion or all of one or more columns may be controlled simultaneously.

The aforementioned example focusing on anti-blooming transistors 44-1 and 44-2 has illustrated the concept of using two transistors in series for per-pixel control, with one of the transistors being controlled on a row-by-row basis and the other transistor being controlled on a column-by-column basis. The two transistors in series may be coupled directly to each other without any intervening structures. For example, no storage capacitors, storage diodes, floating diffusion regions, and/or storage gates are interposed between the two transistors. As shown in FIG. 5, this concept may be applied to other portions of the pixels to further extend the per-pixel control.

As shown in FIG. 5, horizontal transfer transistor 56-1 and vertical transfer transistor 56-2 may be interposed between photodiode 34 and charge storage region 49. Horizontal transfer transistor 56-1 receives horizontal transfer control signal TXOH and vertical transfer transistor 56-2 receives vertical transfer control signal TXOV. The horizontal transfer control signal may be applied to every pixel in a particular row, whereas the vertical transfer control signal may be applied to every pixel in a particular column. Only if both transfer transistors 56-1 and 56-2 are asserted will charge be transferred from photodiode 34 to storage region 49.

In the example of FIG. 5, storage region 49 is formed from storage gate 48. This example is merely illustrative and storage region 49 may be formed from any desired components that store charge. Storage region 49 may include any combination of one or more storage gates, one or more photodiodes, one or more storage capacitors, one or more additional transistors etc.

As shown in FIG. 5, horizontal transfer transistor 46-1 and vertical transfer transistor 46-2 may be interposed between charge storage region 49 and floating diffusion region 42. Horizontal transfer transistor 46-1 receives horizontal transfer control signal TXH and vertical transfer transistor 46-2 receives vertical transfer control signal TXV. The horizontal transfer control signal may be applied to every pixel in a particular row, whereas the vertical transfer control signal may be applied to every pixel in a particular column. Only if both transfer transistors 46-1 and 46-2 are asserted will charge be transferred from charge storage region 49 to floating diffusion region 42.

Including pixels such as pixel 22 in FIG. 5 in image sensor 16 enables control of both the integration time and read-out of the pixels on a per-pixel basis. The integration time of a particular pixel may be started by controlling anti-blooming transistors 44-1 and 44-2. The integration time is then ended by asserting transfer transistors 56-1 and 56-2. Finally, read-out may be controlled by asserting transfer transistors 46-1 and 46-2. This type of per-pixel control has many possible applications such as improved high dynamic range images, per-pixel LED flicker mitigation (LFM), and foveated readout.

Figure 6:
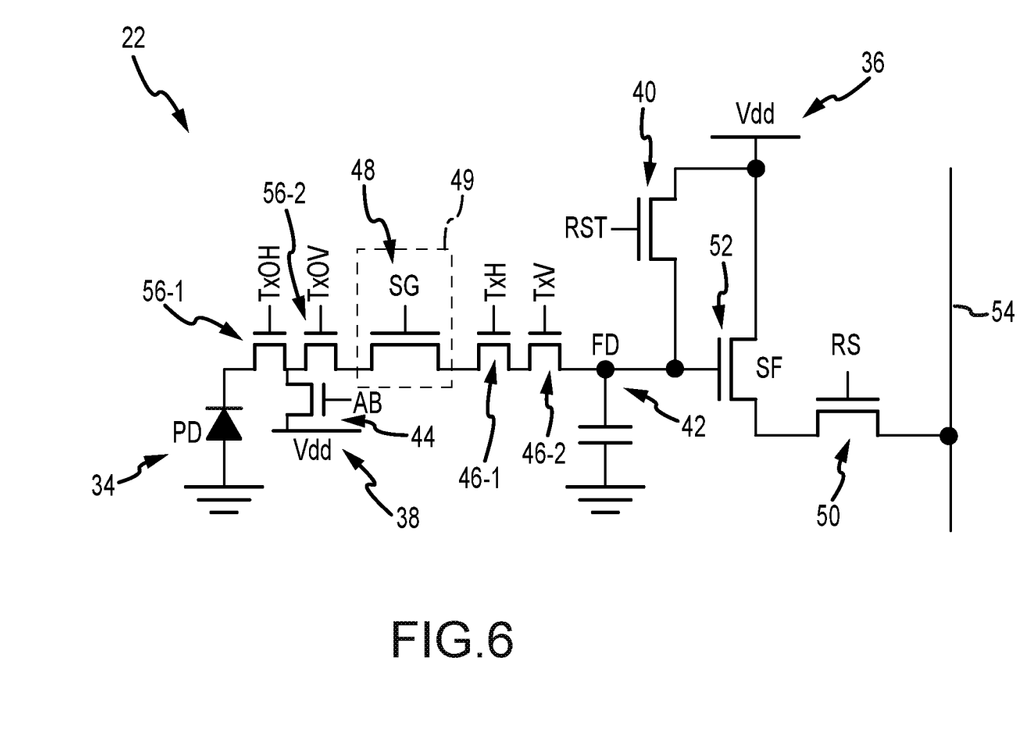
FIG. 6 is a circuit diagram of an illustrative imaging pixel with a charge storage region, per-pixel control, and a dual-function horizontal transfer transistor in accordance with an embodiment of the present invention.

FIG. 6 is a circuit diagram of an illustrative pixel 22 with per-pixel control and less transistors than pixel 22 in FIG. 5. Imaging pixel 22 in FIG. 6 is similar to the pixel of FIG. 5. Pixel 22 in FIG. 6 includes horizontal transfer transistor 56-1 and vertical transfer transistor 56-2 in series between photodiode 34 and charge storage region 49. Pixel 22 also includes horizontal transfer transistor 46-1 and vertical transfer transistor 46-2 in series between charge storage region 49 and floating diffusion region 42.

In FIG. 6, anti-blooming transistor 44 may be coupled to a node that is interposed between transfer transistors 56-1 and 56-2. Anti-blooming transistor 44 may be coupled between the node and power supply terminal 38. Horizontal transfer transistor 56-1 receives horizontal transfer control signal TXOH, vertical transfer transistor 56-2 receives vertical transfer control signal TXOV, and anti-blooming transistor 44 receives anti-blooming control signal AB. The horizontal transfer control signal TXOH may be applied to every pixel in a particular row, the vertical transfer control signal TXOV may be applied to every pixel in a particular column, and the anti-blooming control signal AB may be applied to every pixel in a particular column. Only if both transfer transistors 56-1 and 56-2 are asserted will charge be transferred from photodiode 34 to storage region 49. Similarly, only if both transfer transistor 56-1 and anti-blooming transistor 44 are asserted will photodiode 34 be connected to bias voltage Vdd. Said another way, transistor 56-1 in FIG. 6 performs the function that is performed by both horizontal anti-blooming transistor 44-1 and horizontal transfer transistor 56-1 in FIG. 5.

The arrangement of FIG. 6 allows for per-pixel control of the beginning of the integration time (by controlling transistors 56-1 and 44), the end of the integration time (by controlling transistors 56-1 and 56-2), and read-out (by controlling transistors 46-1 and 46-2) with one less transistor compared to the pixel of FIG. 5. This helps preserve performance of the image sensor while conserving space in the pixel array and reducing manufacturing costs.

Figure 7:
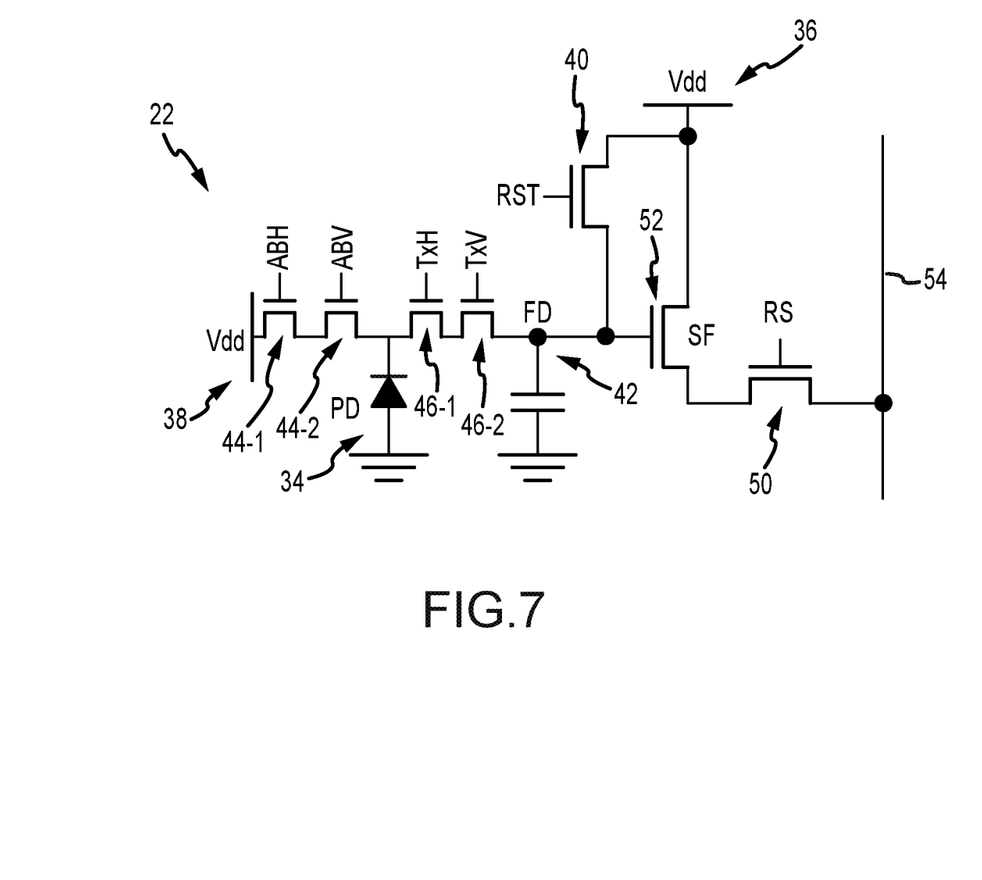
FIG. 7 is a circuit diagram of an illustrative imaging pixel with per-pixel control in accordance with an embodiment of the present invention.
Figure 8:
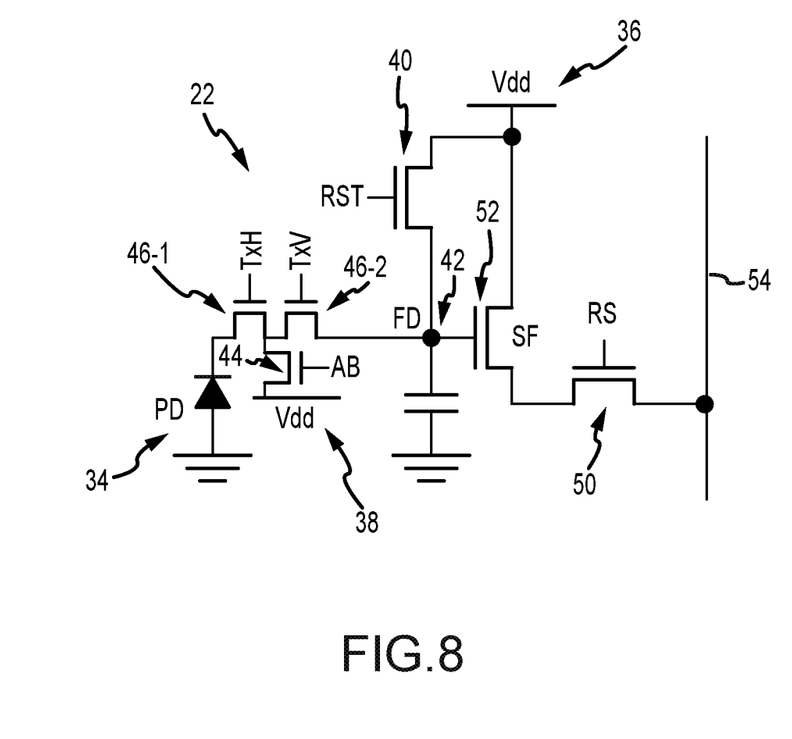
FIG. 8 is a circuit diagram of an illustrative imaging pixel with per-pixel control and a dual-function horizontal transfer transistor in accordance with an embodiment of the present invention.

In the embodiments of FIGS. 5 and 6, pixels 22 included a charge storage region between the photodiode and the floating diffusion region (e.g., to enable a global shutter mode). In the embodiments of FIGS. 7 and 8, the additional charge storage region 49 is not included. As shown, pixel 22 in FIG. 7 includes horizontal transfer transistor 46-1 and vertical transfer transistor 46-2 in series between photodiode 34 and floating diffusion region 42. Pixel 22 also includes horizontal anti-blooming transistor 44-1 and vertical anti-blooming transistor 44-2 in series between photodiode 34 and power supply terminal 38.

Horizontal transfer transistor 46-1 receives horizontal transfer control signal TXH, vertical transfer transistor 46-2 receives vertical transfer control signal TXV, horizontal anti-blooming transistor 44-1 receives horizontal anti-blooming control signal ABH, and vertical anti-blooming transistor 44-2 receives vertical anti-blooming control signal ABV. The horizontal transfer control signal TXH may be applied to every pixel in a particular row, the vertical transfer control signal TXV may be applied to every pixel in a particular column, the horizontal anti-blooming control signal ABH may be applied to every pixel in a particular row, and the vertical anti-blooming control signal ABV may be applied to every pixel in a particular column. Only if both transfer transistors 46-1 and 46-2 are asserted will charge be transferred from photodiode 34 to floating diffusion region 42. Similarly, only if both horizontal anti-blooming transistor 44-1 and vertical anti-blooming transistor 44-2 are asserted will photodiode 34 be connected to power supply terminal 38.

FIG. 8 is a circuit diagram of an illustrative pixel 22 with per-pixel control and less transistors than pixel 22 in FIG. 7. Imaging pixel 22 in FIG. 8 is similar to the pixel of FIG. 7. Pixel 22 in FIG. 8 includes horizontal transfer transistor 46-1 and vertical transfer transistor 46-2 in series between photodiode 34 and floating diffusion region 42. In FIG. 8, anti-blooming transistor 44 may be coupled to a node that is interposed between transfer transistors 46-1 and 46-2. Anti-blooming transistor 44 may be coupled between the node and power supply terminal 38. Horizontal transfer transistor 46-1 receives horizontal transfer control signal TXH, vertical transfer transistor 46-2 receives vertical transfer control signal TXV, and anti-blooming transistor 44 receives anti-blooming control signal AB. The horizontal transfer control signal TXH may be applied to every pixel in a particular row, the vertical transfer control signal TXV may be applied to every pixel in a particular column, and the anti-blooming control signal AB may be applied to every pixel in a particular column. Only if both transistors 46-1 and 46-2 are asserted will charge be transferred from photodiode 34 to floating diffusion region 42. Similarly, only if both transfer transistor 46-1 and anti-blooming transistor 44 are asserted will photodiode 34 be connected to power supply terminal 38. Said another way, transistor 46-1 in FIG. 8 performs the function that is performed by both horizontal anti-blooming transistor 44-1 and horizontal transfer transistor 46-1 in FIG. 7.

The embodiments of FIGS. 3 and 5-8 are merely illustrative and a number of modifications may be made to the pixels if desired. FIGS. 3 and 5-8 all show reset transistor 40 as a single transistor that is accordingly controlled on a per-row basis. However, if desired the reset transistor may be split into two transistors for per-pixel control similar to the anti-blooming transistors and transfer transistors of FIGS. 5-8.

Although not explicitly shown, the pixels of FIGS. 3 and 5-8 may also include dual conversion gain (DCG) capacitors and transistors. In yet another possible embodiment, pixels of the type shown in FIGS. 3 and 5-8 may share a floating diffusion region and read-out circuitry. For example, considering the arrangement of FIG. 5, four photodiodes and corresponding anti-blooming transistors 44-1 and 44-2, transfer transistors 56-1 and 56-2, storage regions 49, and transfer transistors 46-1 and 46-2 may be coupled to a common floating diffusion region. Reset transistor 40, source-follower transistor 52, and row-select transistor 50 may then also be shared between the four photodiodes and corresponding pixel circuitry. This type of sharing may be applied to any of the pixels in FIGS. 3 and 5-8 (with any desired number of photodiodes sharing a common floating diffusion region).

Additionally, the pixels shown in FIGS. 3 and 5-8 may be implemented in a stacked-chip arrangement if desired. The pixel may be split at any desired point or points within the pixel (e.g., between a transistor and the floating diffusion region, between the photodiode and a transistor, between the charge storage region and a transistor, between adjacent transistors, etc.).

In various embodiments, an image sensor may have an array of imaging pixels that each includes a photodiode, a floating diffusion region, a charge storage region interposed between the photodiode and the floating diffusion region, first and second transistors interposed between the photodiode and the charge storage region, and third and fourth transistors interposed between the charge storage region and the floating diffusion region.

Each imaging pixel may include a power supply terminal and fifth and sixth transistors interposed between the photodiode and the power supply terminal. The photodiode may be coupled to the power supply terminal when the fifth and sixth transistors are asserted. The first transistor of each imaging pixel may have a gate that receives a horizontal transfer control signal and the second transistor of each imaging pixel may have a gate that receives a vertical transfer control signal. Charge may be transferred from the photodiode to the charge storage region only when both the first and second transistors are asserted. The image sensor may have a first column of imaging pixels and a first row of imaging pixels, the first transistor of each imaging pixel in the first column may receive the same vertical transfer control signal, and the first transistor of each imaging pixel in the first row may receive the same horizontal transfer control signal.

The third transistor may have a gate that receives an additional horizontal transfer control signal and the fourth transistor may have a gate that receives an additional vertical transfer control signal. Charge may be transferred from the charge storage region to the floating diffusion region only when both the third and fourth transistors are asserted. Each imaging pixel may also include a power supply terminal and a fifth transistor coupled between the power supply terminal and a node that is interposed between the first and second transistors. The photodiode may be coupled to the power supply terminal when the first and fifth transistors are asserted.

In various embodiments an image sensor may have an array of imaging pixels that each includes a photodiode, a floating diffusion region, and first and second transistors interposed between the photodiode and the floating diffusion region. The first transistor may be coupled directly to the second transistor without any intervening structures. The first transistor of each imaging pixel may have a gate that receives a horizontal transfer control signal and the second transistor of each imaging pixel may have a gate that receives a vertical transfer control signal. Charge may be transferred from the photodiode to the floating diffusion region only when both the first and second transistors are asserted. The image sensor may have a first column of imaging pixels and a first row of imaging pixels, the first transistor of each imaging pixel in the first column may receive the same vertical transfer signal, and the first transistor of each imaging pixel in the first row may receive the same horizontal transfer signal.

Each imaging pixel may also include a power supply terminal and a third transistor coupled between the power supply terminal and a node that is interposed between the first and second transistors. The photodiode may be coupled to the power supply terminal when the first and third transistors are asserted. Each imaging pixel may also include a power supply terminal and third and fourth transistors interposed between the photodiode and the power supply terminal. The third transistor may be coupled directly to the fourth transistor without any intervening structures.

In various embodiments, an image sensor may have an array of imaging pixels arranged in rows and columns with each imaging pixel being positioned in a respective row and a respective column. Each imaging pixel may include a photodiode, a floating diffusion region, and first and second transistors interposed between the photodiode and the floating diffusion region. The first transistor of each imaging pixel may have a gate that receives a horizontal transfer control signal associated with the respective row of the imaging pixel and the second transistor of each imaging pixel may have a gate that receives a vertical transfer control signal associated with the respective column of the imaging pixel.

Each imaging pixel may also include a power supply terminal and third and fourth transistors interposed between the photodiode and the power supply terminal. The third transistor of each imaging pixel may have a gate that receives a horizontal anti-blooming control signal associated with the respective row of the imaging pixel and the fourth transistor of each imaging pixel may have a gate that receives a vertical anti-blooming control signal associated with the respective column of the imaging pixel. Each imaging pixel may also include a power supply terminal and a third transistor coupled between the power supply terminal and a node that is interposed between the first and second transistors. The third transistor of each imaging pixel may have a gate that receives an anti-blooming control signal associated with the respective column of the imaging pixel. Charge may be transferred from the photodiode to the floating diffusion region only when both the first and second transistors are asserted.

The foregoing is merely illustrative of the principles of this invention and various modifications can be made by those skilled in the art. The foregoing embodiments may be implemented individually or in any combination.

What is claimed is:
1. An image sensor comprising an array of imaging pixels, wherein each imaging pixel comprises:
 a photodiode;
 a floating diffusion region;
 a charge storage region interposed between the photodiode and the floating diffusion region;

first and second transistors interposed between the photodiode and the charge storage region, wherein the first transistor has a gate that receives a horizontal transfer control signal and wherein the second transistor has a gate that receives a vertical transfer control signal; and third and fourth transistors interposed between the charge storage region and the floating diffusion region, wherein the third transistor has a gate that receives an additional horizontal transfer control signal and the fourth transistor has a gate that receives an additional vertical transfer control signal.

2. The image sensor defined in claim 1, wherein charge is transferred from the photodiode to the charge storage region only when both the first and second transistors are asserted.

3. The image sensor defined in claim 1, wherein the image sensor has a first column of imaging pixels and a first row of imaging pixels, wherein the second transistor of each imaging pixel in the first column receives the same vertical transfer control signal, and wherein the first transistor of each imaging pixel in the first row receives the same horizontal transfer control signal.

4. The image sensor defined in claim 1, wherein charge is transferred from the charge storage region to the floating diffusion region only when both the third and fourth transistors are asserted.

5. The image sensor defined in claim 1, wherein each imaging pixel further comprises:
a power supply terminal; and
fifth and sixth transistors interposed between the photodiode and the power supply terminal.

6. The image sensor defined in claim 5, wherein the photodiode is coupled to the power supply terminal when the fifth and sixth transistors are asserted.

7. The image sensor defined in claim 1, wherein each imaging pixel further comprises:
a power supply terminal; and
a fifth transistor coupled between the power supply terminal and a node that is interposed between the first and second transistors.

8. The image sensor defined in claim 7, wherein the photodiode is coupled to the power supply terminal when the first and fifth transistors are asserted.

9. An image sensor comprising an array of imaging pixels, wherein each imaging pixel comprises:
a photodiode;
a floating diffusion region; and
first and second transistors interposed between the photodiode and the floating diffusion region, wherein the first transistor is coupled directly to the second transistor without any intervening structures, wherein the first transistor of each imaging pixel has a gate that receives a horizontal transfer control signal and wherein the second transistor of each imaging pixel has a gate that receives a vertical transfer control signal; and
a third transistor coupled between a power supply terminal and a node that is interposed between the first and second transistors.

10. The image sensor defined in claim 9, wherein charge is transferred from the photodiode to the floating diffusion region only when both the first and second transistors are asserted.

11. The image sensor defined in claim 9, wherein the image sensor has a first column of imaging pixels and a first row of imaging pixels, wherein the second transistor of each imaging pixel in the first column receives the same vertical transfer signal, and wherein the first transistor of each imaging pixel in the first row receives the same horizontal transfer signal.

12. The image sensor defined in claim 9, wherein the photodiode is coupled to the power supply terminal when the first and third transistors are asserted.

13. An image sensor comprising an array of imaging pixels arranged in rows and columns, wherein each imaging pixel is positioned in a respective row and a respective column and wherein each imaging pixel comprises:
a photodiode;
a charge storage region;
a floating diffusion region;
first and second transistors interposed between the photodiode and the charge storage region, wherein the first transistor of each imaging pixel has a gate that receives a horizontal transfer control signal associated with the respective row of the imaging pixel and wherein the second transistor of each imaging pixel has a gate that receives a vertical transfer control signal associated with the respective column of the imaging pixel; and
third and fourth transistors interposed between the charge storage region and the floating diffusion region, wherein the third transistor of each imaging pixel has a gate that receives an additional horizontal transfer control signal associated with the respective row of the imaging pixel and wherein the fourth transistor of each imaging pixel has a gate that receives an additional vertical transfer control signal associated with the respective column of the imaging pixel.

14. The image sensor defined in claim 13, wherein each imaging pixel further comprises:
a power supply terminal; and
fifth and sixth transistors interposed between the photodiode and the power supply terminal, wherein the fifth transistor of each imaging pixel has a gate that receives a horizontal anti-blooming control signal associated with the respective row of the imaging pixel and wherein the sixth transistor of each imaging pixel has a gate that receives a vertical anti-blooming control signal associated with the respective column of the imaging pixel.

15. The image sensor defined in claim 13, wherein each imaging pixel further comprises:
a power supply terminal; and
a fifth transistor coupled between the power supply terminal and a node that is interposed between the first and second transistors, wherein the fifth transistor of each imaging pixel has a gate that receives an anti-blooming control signal associated with the respective column of the imaging pixel.

* * * * *